CIRCUIT INCLUDING A COUPLING NETWORK FOR POWER AND NOISE MATCHING A COMMON BASE TRANSISTOR

Filed Dec. 28, 1966 3 Sheets-Sheet 1

INVENTOR.
HEIKO BROEKEMA
WILLEM J. LUIJTEN
GERRIT WOLF
ADALBERTUS H.J. NIEVEEN V. DIJKUM
BY
L. R. Trifari DIJKUM
AGENT INVENTOR.
HEIKO BROEKEMA
WILLEM J. LUIJTEN
GERRIT WOLF
ADALBERTUS H.J. NIEVEEN V. DIJKUM
BY
AGENT INVENTOR.
HEIKO BROEKEMA
WILLEM J. LUIJTEN
GERRIT WOLF
ADALBERTUS H.J. NIEVEEN V. DIJKUM
BY

AGENT 3,518,565

CIRCUIT INCLUDING A COUPLING NETWORK FOR POWER AND NOISE MATCHING A COMMON BASE TRANSISTOR

Heiko Broekema and Willem Jacob Luijten, Emmasingel, Eindhoven, and Gerrit Wolf and Adalbertus Hermanus Jacobus Nieveen van Dijkum, Nijmegen, Netherlands, assignors, by mesne assignments, to U.S. Philips Corporation, New York, N.Y., a corporation of Delaware Filed Dec. 28, 1966, Ser. No. 605,486
Claims priority, application Netherlands, Dec. 30, 1965, 6517121
Int. Cl. H03f 3/04
U.S. Cl. 330—31 14 Claims

ABSTRACT OF THE DISCLOSURE

A coupling network is provided between a pair of input terminals, which may be connected to an antenna, and a common base transistor. The network includes a parallel resistive network, and a transformation network that inverts the transistor resistance. The network provides power matching for the input, and noise matching for the transistor. The parallel network may include a resonant circuit. The transformation network may be comprised of a series reactance of one kind and a shunt reactance of the opposite kind.

Figure 1:
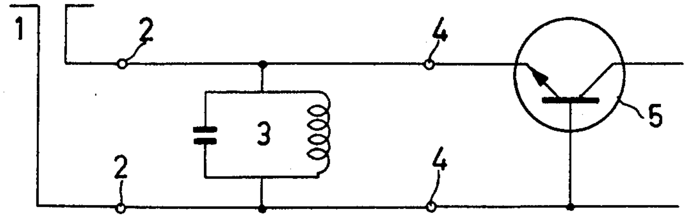

The invention relates to a circuit arrangement for receiving electric signals comprising input terminals for being connected to an input line supplying the signals, for example an aerial lead, and in which the signals are applied from the input terminals to the input of a transistor in common base arrangement through a coupling network having a resonant circuit tuned to the signal frequencies.

Such input circuits are frequently used, for example, in tuners for television receivers, in aerial boosters for television receivers, in radio receivers and in radar receivers or in intermediate amplifiers in a transmission cable. Usually a large number of requirements are imposed upon such circuit arrangements.

First of all, the circuit arrangement must be matched to the impedance of the input line in such a satisfactory manner that substantially all the signal power available at the input terminal is received by the circuit arrangement so that no, or only little, signal energy is reflected and optimum use is made of the available signal power. The correct matching is of particular importance in television and radar receivers since the reflections occurring in the case of an incorrect matching give rise to so-called ghost images during reproduction.

Secondly, the noise factor of the input circuit must be as small as possible. Noise, if any, introduced in further stages is not very interfering; however, the noise of the input circuit is amplified by all the stages and it is consequently this noise which mainly determines the noise properties of the whole circuit arrangement.

Thirdly, it is of importance that the cross modulation produced by the circuit is as small as possible. Cross modulation is caused when an interference signal is received together with the desired signal, and the two signals are mixed in the non-linear transistor. Cross modulation produces a considerable distortion of the desired signal as well as the occurrence of so-called side receptions in which the same transmitter is received with several tunings.

Fourthly, the input circuit of a receiver should be capable of handling large signals in a distortion-free manner. The signal amplitudes received by the aerial of a receiver may vary strongly in accordance with the intensity and the distance of the transmitters. As regards the further stages of the receiver, these variations are usually reduced considerably by means of an automatic volume control. However, these variations are fully present at the input stage.

It is the object of the invention to provide a circuit arrangement in which, as regards the above properties, considerable improvements can be obtained with respect to known circuits. According to the invention, in order to achieve both substantially optimum power matching of the input line and substantially optimum noise matching of the transistor, the resonant circuit in the coupling network comprises one or more elements dissipating signal power and operating parallel across the resonant circuit and that the coupling between the transistor and the resonant circuit is such that said coupling operates as a transformation network inverting the transistor input resistance.

An inverting transformation network is to be understood to mean herein a network which transforms the resistance so that if the said resistance decreases, the transformed resistance increases.

Figure 11:
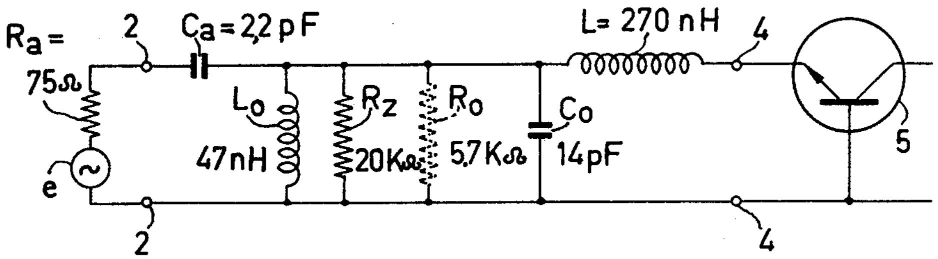
Figure 12:
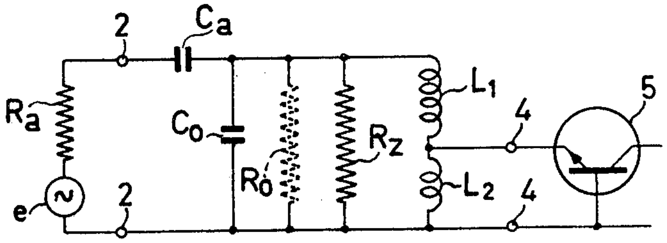
Figure 13A:
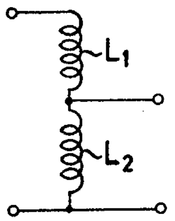
Figure 13B:
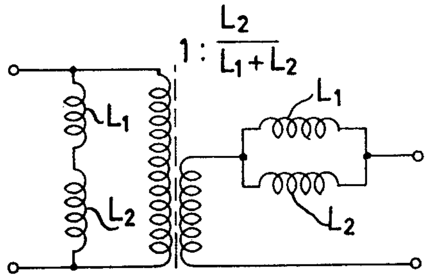
Figure 14:
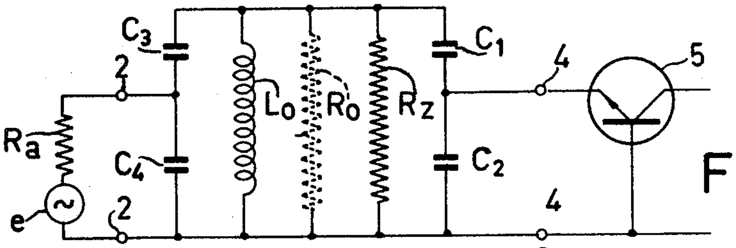

In order that the invention may readily be carried into effect, certain embodiments thereof will now be described in greater detail, by way of example, with reference to the accompanying drawings, in which:

FIGS. 1, 2, 3, 4 serve for explaining the operation of known circuit arrangements;

FIGS. 5, 6, 7, 8 and 9 serve for explaining the operation of the circuit arrangement according to the invention;

FIGS. 11, 12, 14 and 16 show several embodiments of a circuit arrangement according to the invention; and FIGS. 13 and 15 serve to explain the operation of the circuit arrangement shown in FIG. 12 and FIG. 14, respectively.

FIG. 1 shows a simplified circuit diagram of a conventional input circuit of a receiver. An aerial 1 is connected to aerial terminals 2 of the input circuit occasionally through a balancing (balun)-transformer (not shown). The signal power supplied by the aerial is applied, through a coupling network which comprises a resonant circuit 3 tuned to the signal frequencies, to the input terminals 4 of a transistor 5 in common base arrangement.

Figure 2:
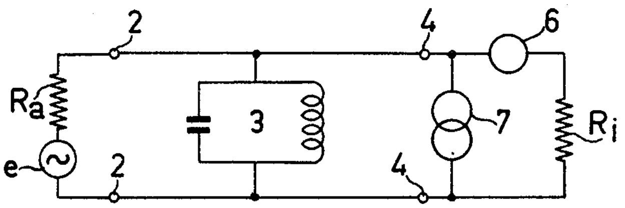

FIG. 2 shows an equivalent circuit diagram of the circuit arrangement shown in FIG. 1. A signal voltage souce *e* supplies the signal voltage received by the aerial, while the aerial resistance is denoted by resistor $R_a$. The resistor $R_i$ denotes the internal input resistance of the transistor 5 which may be, for example, 11 ohm. The noise produced by the transistor 5 is denoted by a noise voltage source 6 in series with the resistor $R_i$ and a noise current source 7 parallel across the transistor input terminals 4.

In order that the aerial supplies the maximum signal power so that no aerial reflections occur, the aerial resistance $R_a$ should be chosen to be equal to the input resistance $R_i$ of the transistor. If the resistance of the aerial itself is unequal to the input resistance of the transistor, the matching may be effected by means of an impedance transformer which may be included, for example, between the aerial terminals 2 and the resonant circuit 3 or between the resonant circuit 3 and the transistor input terminals 4.

Figure 3:
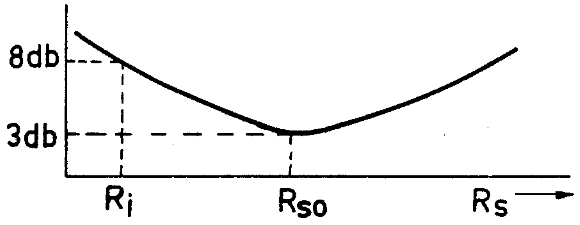

The two noise sources 6 and 7 supply noise energy which depends upon the value of the source impedance $R_s$ connected to the transistor terminals 4 which is the impedance at the terminals 4 viewed in the direction of the aerial. This dependence may be explained as follows. If the source impedance is very low ohmic, the noise current source 7 is short-circuited by said source impedance. The noise voltage source 6, however, then is fully operative across the transistor input so that the transistor produces very much noise. On the other hand, if the source impedance $R_s$ is very high ohmic, the noise voltage source 6 is inoperative, the noise current supplied by the source, 7, however, then flows fully through the transistor so that likewise very much noise is produced by the transistor. At a given value $R_{so}$ of the source impedance the noise produced by the transistor is at a minimum. The relation between the source resistance $R_3$ and the noise power (in db) is shown in FIG. 3.

A great problem which occurs in particular in transistors in common base arrangement is that the internal resistance $R_i$ and the optimum noise resistance $R_{so}$ of the commonly used transistors may differ considerably from one another. For example, the internal resistance may be approximately 11Ω and the optimum source resistance approximately 100Ω. If, as described with reference to FIG. 2, the aerial is matched at an optimum, $R_a$ is equal to $R_i$ and the source resistance $R_s$ of the transistor is equal to its internal impedance $R_i$. As shown in FIG. 3, the noise factor of the transistor (8 db) then is considerably larger than the minimum achievable noise factor (3 db).

Figure 4:
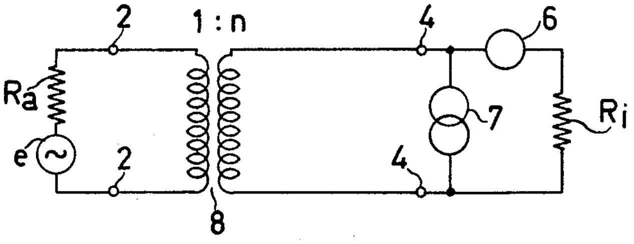

Of course it is alternatively possible to choose the source impedance of the transistor at an optimum for noise matching by means of an impedance transformer 8 between the aerial terminals 2 and the transistor terminals 4. This is shown in FIG. 4, in which the resonant circuit 3 is not shown to avoid drawing complexity. The turns ratio $n$ of the transformer 8 must then be equal to $$n=\sqrt{\frac{R_{so}}{R_a}}$$

so that the source resistance connected to the terminals 4 is equal to $R_{so}=n^2R_a=100\Omega$. The noise factor of the transistor then is at a minimum (3 db); the load for the aerial occurring across the aerial terminals 2, however, then is equal to $$\frac{R_i}{n^2}=\frac{R_i}{R_{so}}=0.11R_a$$

as a result of which a considerable mismatching of the aerial and thus strong aerial reflections occur.

The above-described problem can be solved by using transistors in which the optimum source resistance is approximately equal to the internal impedance. In this case it is possible both to match the aerial correctly and to give the transistor the optimum source resistance. It has been found, however that the minimum noise factor of such a transistor is considerably higher than in the conventional transistors.

A considerably more favourable circuit arrangement is obtained if considerable signal losses are introduced in the coupling network between the aerial terminals 2 and the transistor input terminals 4. This is diagrammatically shown in FIG. 5 by means of the resistor $R_p$. For optimum aerial matching the requirement holds that:

$$\frac{1}{R_a}=\frac{1}{R_p}+\frac{1}{R_i} \qquad \text{(I)}$$

and for optimum noise adaptation of the transistor the requirement holds that:

$$\frac{1}{R_{so}}=\frac{2}{R_p}+\frac{1}{R_a} \qquad \text{(II)}$$

Elimination of $R_a$ from (I) and (II) gives:

$$\frac{1}{R_{so}}=\frac{2}{R_p}+\frac{1}{R_i} \text{ or } \frac{1}{R_p}=\frac{1}{2}\left(\frac{1}{R_{so}}-\frac{1}{R_i}\right)$$

As shown in FIG. 3, $R_{so}$ in the transistors commonly used for aerial input stages is larger than $R_i$ the expression $$\frac{1}{R_{so}}-\frac{1}{R_i}$$

then is negative so that the required parallel resistor $R_p$ likewise is negative.

A solution to this difficulty cannot be found by arranging a transformer 9 with tightly coupled windings between the loss resistor $R_p$ and the transistor input terminals 4. This will be explained with reference to FIG. 6.

In this circuit arrangement the load for the aerial is constituted by the parallel arrangement of $R_p$ and the internal transistor impedance $R_L'$ transformed to the primary side of the transformer 9 which it holds that $$R_i'=\frac{R_i}{n^2}$$

For optimum aerial matching it consequently holds that $$\frac{1}{R_a}=\frac{1}{R_p}+\frac{1}{R_i'}=\frac{1}{R_p}+\frac{n^2}{R_i} \qquad \text{(III)}$$

The noise impedance $R_s$ of the transistor is constituted by transforming the source impedance $R_s'$ present on the primary side and for which it holds that:

$$\frac{1}{R_s'}=\frac{1}{R_a}+\frac{1}{R_p}$$

to the secondary side according to $R_s=n^2R_s'$. From this it follows that:

$$\frac{1}{R_s'}=\frac{n^2}{R_s}=\frac{1}{R_a}+\frac{1}{R_p} \qquad \text{(IV)}$$

Elimation of $1/R_a$ from (III) and (IV) gives:

$$\frac{n^2}{R_s}=\frac{2}{R_p}+\frac{n^2}{R_i}$$

and for optimum noise matching of the transistor it must consequently hold that:

$$\frac{n^2}{R_{so}}=\frac{2}{R_p}+\frac{n^2}{R_i}$$

or $$\frac{1}{R_p}=\frac{n^2}{2}\left(\frac{1}{R_{so}}-\frac{1}{R_i}\right)$$

Figure 5:
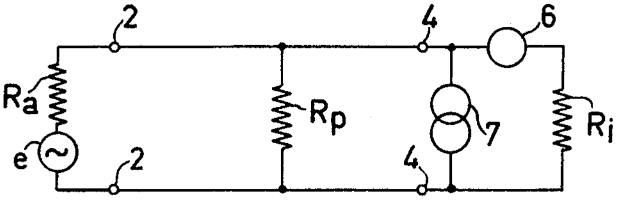
Figure 6:
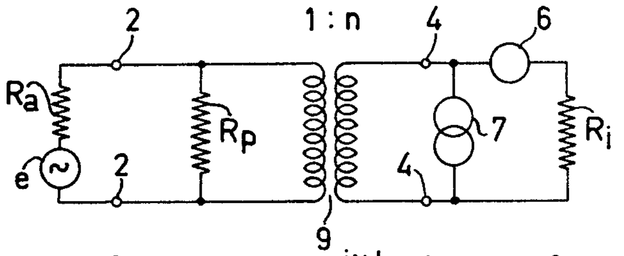

Since $R_{so}$ is larger than $R_i$ the required loss resistor $R_p$ is negative as in the circuit shown in FIG. 5.

Figure 7:
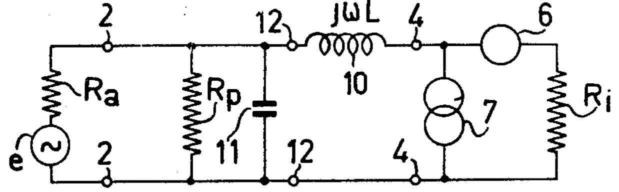

A solution can be found by including a transformation network which inverts the transistor input resistance $R_i$ between the loss resistor $R_p$ and the transistor terminals 4. This transformation network comprises, for example, a series reactance which is large with respect to the input resistance $R_i$ of the transistor, for example, is at least five times larger than $R_i$. This latter is shown in FIG. 7. This figure shows a transformation network having a series inductance 10, the reactance $j\omega L$ of which is large with respect to $R_i$ and a parallel capacitor 11 which is connected on the aerial side of the inductance 10.

The impedance which is found at the points 12 and viewed in the direction of the transistor is equal to $R_i+j\omega L$. The corresponding admittance is $$\frac{1}{R_i+j\omega L}=\frac{R_i-j\omega L}{R_i^2+(\omega L)^2}$$

which consists of a real part $$\frac{R_i}{R_i^2+(\omega L)^2}$$

and an imaginary part:

$$\frac{-j\omega L}{R_i^2+(\omega L)^2}$$

The impedance at the points 12 viewed in the direction of the transistor can consequently be represented by the parallel circuit of a resistor $$R_i'=\frac{R_i^2+(\omega L)^2}{R_i}=R_i+\frac{(\omega L)^2}{R_i}$$

and of an inductance L′ with an impedance $$j\omega L'=\frac{R_i^2+(\omega L)^2}{-J\omega L}=j\omega L+j\frac{R_i^2}{\omega L}$$

Figures 8, 9:
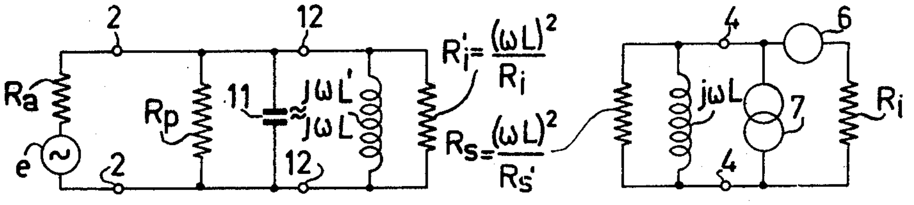

If $\omega L \gg R_i$ it holds that:

$$R_i'=\frac{(\omega L)^2}{R_i}$$

and $j\omega L'=j\omega L$. The equivalent circuit diagram thus obtained is shown in FIG. 8. The capacitor 11 is chosen to be so large that for the signal frequencies the inductance $j\omega L'$ is tuned away (the impedance of the capacitor 11 consequently is equal to $-j\omega L' \approx -j\omega L$), that the total load for the aerial is ohmic. The transformation network comprising the inductance 10 and the capacitor 11 consequently transforms the secondary load $R_i$ to a load $R_i'$ occurring on the primary side which is equal to $$\frac{(\omega L)^2}{R_i}$$

So in this transformation inversion occurs.

The secondary source impedance occurring at the terminals 4 (see FIG. 7) can be determined in a corresponding manner. The source impedance on the primary side of the transformation network is $R_s'$ in which it holds that $$\frac{1}{R_s'}=\frac{1}{R_a}+\frac{1}{R_p}$$

The source impedance at the points 12 which is constituted by the resistor $R_s'$ and the capacitor 11 is consequently equal to $$\frac{-j\omega LRS_s'}{R_s'-j\omega L}$$

and the source impedance at the transistor input terminals 4 is equal to $$\frac{-jL\cdot R_s'}{R_s'-j\omega L}+j\omega L=\frac{(\omega L)^2}{R_s'-j\omega L}$$

The source admittance at the terminals 4 consequently is equal to $$\frac{R_s'-j\omega L}{(\omega L)^2}$$

and consists of a real part $$\frac{R_s'}{(\omega L)^2}$$

and an imaginary part $$\frac{-j\omega L}{(\omega L)^2}=\frac{1}{j\omega L}$$

The source impedance at the terminals 4 may consequently be represented by the parallel circuit of a resistor $$R_s=\frac{(\omega L)^2}{R_s'}$$

and an inductance $j\omega$L (see FIG. 9).

As was demonstrated above, the fact that the optimum source resistor $R_{so}$ for noise matching of the transistor is larger than the internal resistor $R_i$ of the transistor was the cause that the loss resistor $R_p$ which is required to obtain both optimum aerial adaptation and optimum noise adaptation, is negative. By the intermediate connection of the inverting transformation network 10–11 it is achieved that on the primary side of the transformation network the optimum source resistance $R_{so}'$ is smaller than the load resistance $R_i'$ so that a positive and consequently easily realizable loss resistance $R_p$ can be used.

If, for example $R_i$=11 ohm and $R_{so}$=100 ohm and if $\omega L$=340 ohm, $$R_i'=\frac{(\omega L)^2}{R_i}=\frac{(340)^2}{11}=10.5\text{K ohm}$$

and $$R_{so}'\frac{(\omega L)^2}{100}=1160\text{ ohms}$$

For optimum aerial matching it follows that:

$$\frac{1}{R_a}=\frac{1}{R_p}+\frac{1}{R_i'} \quad \text{(V)}$$

and for optimum noise matching:

$$\frac{1}{R_{so}'}=\frac{1}{R_a}+\frac{1}{R_p} \quad \text{(VI)}$$

from which by elimination of $1/R_a$ it follows that:

$$\frac{1}{R_{so}'}=\frac{2}{R_p}+\frac{1}{R_i'} \text{ or } \frac{1}{R_p}=\frac{1}{2}\left(\frac{1}{R_{so}'}-\frac{1}{R_i'}\right)$$

With $R_{so}'$=1160 ohm and $R_i$=10.5K ohm it is found herefrom that: $R_p$=2.6K ohm; together with (V) it follows that:

$$\frac{1}{R_a}=\frac{1}{2.6}+\frac{1}{10.5}\text{ m℧ or } R_a=2.09\text{K ohm}$$

By means of a transformation network between the aerial terminals 2 and the loss resistance $R_p$ the aerial resistance active across the loss resistance can be brought to the value found.

With this proportioning of the signal power supplied by the aerial a factor $$\frac{R_i}{R_i+R_p}=80\%$$

is dissipated in the coupling network.

By providing the losses $R_p$ in the coupling network an optimum noise matching of the transistor is consequently obtained without the aerial matching being lost. As shown in FIG. 3 this provides a decrease of the noise factor of the transistor of approximately 5 db. On the other hand it must be taken into account that as a result of the losses $R_p$ the signal power available at the transistor input terminal decreases. This causes an increase of the noise factor which is equal to the loss of the signal power available. The signal power available at the terminals 2 is equal to $$\frac{e^2}{4R_a}$$

while the signal power available at the terminals 4 is equal to $$\frac{e^2R_p}{4R_a(R_a+R_p)}$$

The noise factor is consequently increased by a factor $$\frac{R_a+R_p}{R_p}$$

With the proportioning indicated this increase is 1.8=2.53 db. The ultimately resulting decrease of the noise factor consequently is approximately 5−2.53 db=2.47 db.

It is to be noted that in practice a small deviation from the optimum aerial matching is permissible while in addition the source impedance of the transistor may be chosen to be somewhat lower than the optimum source impedance. The losses $R_p$ may be chosen to be smaller accordingly which provides some additional improvement of the noise factor.

In addition it is to be noted that, as appears from FIG. 9, the source impedance of the transistor is not fully real as a result of the transformation network 10–11 but has an inductive character. This is of advantage because the optimum source impedance for noise matching of the transistor likewise has an inductive character. In a transistor with a capacitive optimum source impedance an inverting transformation network may advantageously be used with a capacitive series reactance.

The coupling network usually comprises between the aerial terminals and the transistor input a selective circuit which is tuned to the signal frequency (compare circuit 3 in FIG. 1). A further important aspect of the invention consists in that the losses to be introduced in the coupling network (compare $R_p$) are used to increase the selectivity of the input circuit considerably. This may be further explained as follows:

The resonant circuit 3 suitable for receiving signals of, for example, 200 mc./s., may comprise a capacitance $C_0$ of 14 pf. and an inductance $L_0$ of 45 nh. The unloaded Q-factor $Q_0$ of such circuits is approximately 100. The natural losses of the circuit may consequently be represented by a parallel resistor $R_0$ for which it holds that:

$$R_o=Q_o\sqrt{\frac{L_o}{C_o}}=5.7\text{K ohm.}$$

Figure 10:
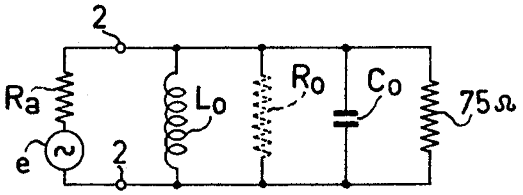

In normal circuits in which it is ensured that the aerial power available is applied substantially entirely to the transistor input, the aerial, having a resistance of approximately 75 ohm, may be directly connected to the circuit 3, while the transistor input is connected to the circuit through a transformation network which brings the transistor input impedance operative across the circuit at substantially the same value as the aerial resistance so that all the available aerial power is applied to the transistor. The equivalent circuit diagram is shown in FIG. 10. The total attenuation at the circuit is constituted by $R_o$=5.7 K ohm and the two resistors of 75 ohm connected in parallel therewith, so that the total damping resistance $R_d$ of the circuit in the loaded condition is approximately 37.5 ohm. The Q-factor of the circuit in the loaded condition is $$Q=R_d\sqrt{\frac{C_o}{L_o}}=0.66$$

In the circuit arrangements according to the invention in which considerable signal losses occur in the coupling network a considerably higher loaded Q-factor and consequently a much better selectivity can be obtained if the aerial resistance operative across the circuit and the input impedance of the transistor are stepped up in such manner that the required losses in the coupling network are constituted for a great part by the natural losses ($R_o$) of the circuit. If, in agreement with the above numerical values, the aerial resistance $R_a$ operative across the circuit is made equal to 2.09 K ohm and the transistor input impedance $R_i'$ operative across the circuit is made equal to 10.5 K ohm and if the natural losses of the circuit $R_o=R_p$=2.6 K ohm, the total damping resistance across the circuit is equal to $R_d=R_a//R_p//R_i'$=1.45 K ohm. The loaded Q-factor of the circuit is $$Q=R_d\sqrt{\frac{C_o}{L_o}}=25.5$$

It is to be noted that if the natural losses of the circuit are too small they can be increased by an additional parallel resistor across the circuit.

In addition it is noted that the capacitor 11 shown in FIG. 7, which forms part of the inverting transformation network 10, 11, in circuit arrangements with a resonant circuit is a part of the tuning capacity of the said circuit.

FIG. 11 shows the proportioning of a circuit arrangement tested in practice for receiving signals of approximately 200 mc./s. The input resistor $R_i$ of the transistor is 11 ohm and the optimum source admittance of the transistor is $10-j4$ m℧, which corresponds to the parallel arrangement of a resistor $R_{so}$ of 100 ohm and an inductance of 200 nh. The connected aerial has a resistance $R_a$ of 75 ohm.

The aerial is connected to the circuit through a small capacity $C_a$ of 2.2 pf. which steps up the aerial resistance to 1.82 K ohm. The transistor is connected to the circuit through a comparatively large inductance of 270 nh. which produces the inversion of the transistor input impedance and which also steps up the said transistor input impedance to 10.5 K ohm. The resonant circuit consists of a capacitance $C_o$ of 14 pf. and an inductance $L_o$ of 47 nh. The natural losses of the circuit are denoted by a resistor $R_o$ of 5.7 K ohm and an additional damping resistor $R_z$ of 20 K ohm is connected parallel across the circuit. The total loss resistance $R_p$ which is constituted by the parallel arrangement of $R_o$ and $R_z$ is 4.45 K ohm.

With this proportioning the source admittance occurring at the terminals 4 is equal to $11-j3$ m℧, so that the transistor has substantially the correct source impedance for noise matching. The Q-factor of the circuit is 22.4. The standing wave ratio at the aerial terminals is 1.7 which means that 93% of the aerial power available is applied to the circuit arrangement. Such a small mismatch is permissible in general.

In this circuit arrangement 70% of the signal power supplied by the aerial is dissipated in the loss resistors $R_o$ and $R_z$. The noise factor is 4.5 db which is considerably more favourable than in the conventional circuits, which, in general, have a noise factor of 8 db or more.

The advantages of the new circuit arrangements with respect to the conventional circuits are the following.

In addition to the better noise properties, the new circuit arrangements have considerably better cross modulation properties. This is a result of the better selectivity so that adjacent transmitters are suppressed more strongly and of the fact that the losses included in the coupling network cause an attenuation not only of the desired signal but also of the undesired signals.

The attenuation of the desired signal produced by the coupling network is also of advantage, since as a result of this the receiver is better suitable for processing large aerial signals without inadmissable distortion. Naturally, said attenuation also causes loss of amplification of the useful signal but since said attenuation is associated with a more favourable signal-to-noise ratio, this amplification loss can simply be compensated for by increasing the amplification of a further stage of the receiver, for example, of an intermediate frequency amplifier stage.

As a result of the series reactance between the resonant circuit and the transistor input (for example, the inductance L in FIG. 11) which is high-ohmic with respect to the input impedance of the transistor, further advantages are obtained. As a result of the current control of the transisor caused by he said reactance it is prevented that the non-linear current voltage input characteristic of the transistor can produce distortion; this results in a further improvement of the cross modulation properties and of the power of processing large signals.

Furthermore an improvement in the control properties of the transistor is obtained. In conventitonal circuits which are included, for example, in a television tuner which must be capable of receiving both UHF signals and VHF signals, the transistor is set so that with small input signals said transistor produces the maximum amplification in UHF position. If the input signals increase the direct current adjustment of the transistor is increased, as a result of which the amplification produced as a result of the decreasing current amplification factor decreases. In the VHF position, the amplification, starting from the above direct current adjustment, however, first increases as a result of the increase of the steepness of the transistor and then decreases as a result of the decrease of the current amplification factor. In a circuit arrangement with a large series reactance such an undesired increase of the amplification across the first part of the control range does not occur as a result of the current drive, since in this case the steepness of the transistor has no influence on the amplification.

Another favourable aspect if the amplification of the transistor is controlled is the following.

In a controlled transistor the input impedance $R_i$ of, for example, 11 ohm in the non-controlled condition, varies to, for example, 5.5 ohm in the fully controlled condition. In the conventional circuit arrangements in which the greater part of the power supplied by the aerial flows to the transistor, the matching of the aerial varies strongly with varying transistor input impedance. In the circuit arrangements according to the invention on the contrary, in which the greater part of the signal power is dissipated in the coupling network, the variation of the transistor input impedance has hardly any influence on the aerial matching so that the said adaptation remains substantially optimum throughout the control range.

The series reactance between the resonant circuit and the transistor input, and likewise the possible series reactance between the resonant circuit and the aerial terminals, may be present in a more or less hidden manner.

It is possible, for example, to connect the transistor input to a tap of the inductance $L_0$ of the circuit in which the mutual coupling between the parts of the inductance is chosen to be so small that the stray inductance at the tap is high-ohmic with respect to the input impedance of the transistor. Alternatively, the transistor may be connected to a coupling winding coupled magnetically to the inductance $L_0$, the coupling being so loose that a large stray inductance is obtained.

The inductance $L_0$ may also be displaced by two series-arranged inductances $L_1$ and $L_2$ not magnetically coupled in which the common point of said inductances is connected to the transistor (see FIG. 12). The inductance constituted by the parallel-arrangement of the two inductances, which in analogy with the stray inductance occurring in coupled windings is likewise terminal stray inductance, is chosen to be high-ohmic with respect to the input impedance of the transistor. This is shown in greater detail in FIGS. 13*a* and 13*b*, of which FIG. 13*b* shows an equivalent circuit diagram of the series-connected inductances $L_1$ and $L_2$ shown in FIG. 13*a*. The equivalent circuit diagram comprises an ideal transformer with turns ratio $$\frac{L_2}{L_1+L_2}$$

an inductance connected parallel across the primary side, (the circuit side) which is equal to the series-arrangement $L_1+L_2$ of the two inductances $L_1$ and $L_2$, and an inductance connected in series with the secondary winding which is equal to the parallel arrangement $$\frac{L_1L_2}{L_1+L_2}$$

of the two inductances. From this equivalent circuit diagram it may be seen that the parallel arrangement of the inductances $L_1$ and $L_2$ serves as a series reactance which must be high-ohmic relative to the transistor input impedance in order to operate as an inverting transformer network.

Figure 15A:
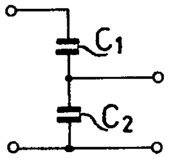
Figure 15B:
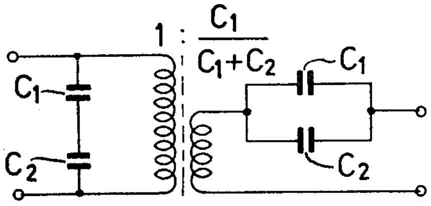

It is possible in an analogous manner to replace the circuit capacity $C_0$ by the series arrangement of two capacitors $C_1$ and $C_2$, in which the common point of the capacitors $C_1$ and $C_2$ is connected to the transistor input. This is shown in FIG. 14, which circuit arrangement also comprises two series-arranged capacitors $C_3$ and $C_4$ to the common point of which the aerial is connected. As shown in FIGS. 15*a* and 15*b* the series arrangement of $C_1$ and $C_2$ may be replaced by a transformer with turns ratio $$\frac{C_1}{C_1+C_2}$$

a capacitor connected parallel across the primary side which is equal to the series arrangement $$\frac{C_1C_2}{C_1+C_2}$$

of the two capacitors $C_1$ and $C_2$, and a capacitance connected in series with the secondary side which is equal to the parallel-arrangement $C_1+C_2$ of the two capacitors $C_1$ and $C_2$. This parallel capacitance $C_1+C_2$ which, in analogy with the stray inductance occurring in coupled windings, is termed stray capacitance must be high-ohmic with respect to the input impedance of the transistor, so that it operates as inverting transformer.

As was described above, the network $C_1$, $C_2$ serves not only for stepping up the transistor input impedance but also for ensuring that whereas on the secondary (transistor) side the input impedance $R_1$ is lower than the source impedance $R_s$, the transistor input impedance $R_i'$ on the primary (circuit) side is higher than the source impedance $R_s'$.

The function of the network $C_3$, $C_4$ on the contrary, is only to step up the aerial impedance. In this case it is not necessary that the stray capacitance constituted by the parallel arrangement of $C_3$ and $C_4$ is high-ohmic with respect to the aerial impedance.

Figure 16:
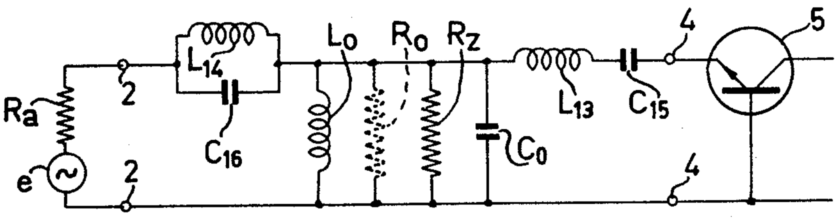

FIG. 16 shows a circuit for receiving signals which are located in two different frequency bands, for example, for receiving television signals which are located in the so-called VHF-band I (40–70 mc./s.) and those in the so-called VHF-band III (180–220 mc./s.).

Between the resonant circuit $L_0$, $C_0$ and the transistor input the series arrangement of an inductance $L_{13}$ and a capacitance $C_{15}$ is included, while between the resonant circuit $L_0$, $C_0$ and the aerial the parallel arrangement of an inductance $L_{14}$ and a capacitor $C_{16}$ is connected.

On receiving signals in the higher frequency band, the inductance $L_{13}$ produces the transformation of the transistor input impedance and the capacitor $C_{16}$ produces the transformation of the aerial impedance. The capacitor $C_{15}$ at these frequencies has a negligibly small impedance while the impedance of the inductance $L_{14}$ is very high. On receiving signals in the lower frequency band the capacitance $C_{15}$ and the inductance $L_{14}$ are operative for the transformation of the transistor input impedance and the aerial impedance. The impedance of the inductance $L_{13}$ is negligibly low and that of the capacitance $C_{16}$ is very high. The band commutation and the tuning in a band may be effected, for example, by commutation or variation of $L_0$ and/or $C_0$.

It is to be noted that it can be measured in a simple manner what part of the signal power applied by the aerial is dissipated in the coupling network. For that purpose, the quality $Q_1$ of the resonant circuit is measured without aerial load, so with the aerial switched off or short-circuited, but with the transistor connected. In addition the quality $Q_2$ of the resonant circuit is measured without aerial load and likewise without the circuit being loaded by the transistor; both the aerial and the transistor input should be switched off or short-circuited in this case. The part of the signal power supplied by the aerial which is dissipated in the coupling network then is equal to $Q_1/Q_2$.

What is claimed is:

1. A circuit arrangement for receiving electric signals comprising input terminals for being connected to an input line supplying the signals, and in which the signals are applied from the input terminals to the input of a transistor in common base arrangement by way of a coupling network having a resonant circuit tuned to the signal frequencies, characterized in that in order to achieve both substantially optimum power matching of the input line and substantially optimum noise matching of the transistor, the resonant circuit in the coupling network comprises dissipating means connected to dissipate signal power and operating in parallel across the resonant circuit and that the portion of the coupling network between the transistor and the resonant circuit further comprises transformation network means for inverting the transistor input resistance.

2. A circuit arrangement as claimed in claim 1, characterized in that more than half of the signal power applied to the circuit by the input line is dissipated in the said dissipating means.

3. A circuit arrangement as claimed in claim 1, characterized in that the transformation network means between the transistor and the resonant circuit comprises a series reactance having an impedance at least 5 times higher than the input resistance of the transistor.

4. A circuit arrangement as claimed in claim 3, in which the optimum source impedance for noise matching of the transistor comprises a reactive component, characterized in that the series reactance of the inverting transformation network is reactive and of the same type as said component.

5. A circuit arrangement as claimed in claim 1 for receiving electric signals which are located in two frequency bands, characterized in that the transformation network means between the input of the transistor and the resonant circuit comprises a series reactance which consists of the series arrangement of an inductance and a capacitance in which the resonant frequency of the series arrangement lies between the two frequency bands, that the reactance of the inductance is large with respect to the input resistance of the transistor for the signals lying in the high frequency band and the reactance of the capacitance is large with respect to the input resistance of the transistor for the signals lying in the lower frequency band.

6. A circuit for receiving electric signals, from a source of said signals, comprising a transistor connected as a common-base amplifier, and means for coupling said signals to the input of said amplifier to obtain substantially optimum power matching with substantially minimum noise production in said transistor, said coupling means comprising a shunt parallel resonant circuit, said resonant circuit including at least one power dissipating element connected in parallel in said resonant circuit, and reactive means between said resonant circuit and said transistor, the elements of said reactive means and resonant circuit being proportioned with respect to each other to form a transformation network that inverts the input resistances of said transistor, whereby said input resistance is transformed to an equivalent resistance, with respect to said resonant circuit, that is an inverse function of said input resistance.

7. A circuit for receiving a signal from a signal source of given impedance comprising a pair of input terminals connected to said source, a transistor connected as a common base amplifier, and a matching network connected between said terminals and the base-emitter path of said transistor, said matching network comprising first circuit means including resistor means, means connecting said first circuit means between said terminals whereby some of the power of the signals from said source is dissipated in said resistor means, and second circuit means connected between said first circuit means and said base-emitter path, said second circuit means comprising a transformation network which inverts the input resistance of said transistor, whereby the impedance of said circuit between said terminals in the absence of said source is substantially equal to said given impedance and the impedance of said circuit at its connection to said transistor in the absence of said transistor is substantially equal to the optimum source impedance for noise matching of said transistor.

8. A circuit for receiving a signal from a signal source of given impedance comprising a pair of input terminals connected to said source, a transistor connected as a common base amplifier, and an impedance matching network connected between said terminals and the emitter-base path of said transistor, said matching network comprising resistive means, means connecting said resistive means between said terminals whereby a portion of the power of the signals of said source is dissipated in said transistor, reactive means, and means coupling said reactive means between said resistive means and the emitter-base path of said transistor whereby said reactive means inverts the input resistance of said transistor to effectively connect a resistance in parallel with said resistive means, as viewed from said input terminals, that is inversely proportional to said input resistance of said transistor, whereby the impedance between said terminals in the absence of said source is substantially equal to said given impedance and the impedance of said circuit at its connection to said transistor in the absence of said transistor is substantially equal to the optimum source impedance for noise matching of said transistor.

9. The circuit of claim 8 comprising second reactive means of opposite kind with respect to said first-mentioned reactive means connected in parallel in said network, said second reactive means having a reactance at the frequency of said signals whereby the impedance between said terminals in the absence of said source is substantially resistive.

10. The circuit of claim 9 wherein said first mentioned reactance means comprises a portion of a reactance element extending from one end thereof including a tap thereon, and further comprising means connecting the remaining portion of said reactance element in parallel with said emitter-base path, said reactance element and second reactive means forming a resonant circuit.

11. The circuit of claim 10 wherein said reactance element is a coil, wherein the reactance of the stray inductance of the parallel arrangement of the two portions of said coil on opposite sides of said tap is large with respect to said input resistance.

12. The circuit of claim 10 wherein said reactance element is capacitive and is comprised of a first capacitance means connected between said end and said tap and a second capacitive means connected between said other end and said tap, the reactance of the capacitance of a parallel arrangement of said capacitance means being large with respect to said input resistance.

13. The circuit of claim 8 wherein said resistive means forms part of a parallel resonant circuit connected between said terminals, whereby said reactive means increases the selectively of said resonant circuit.

14. The circuit of claim 8 wherein said means connecting said resistive means between said terminals comprises a series reactance means which has a reactance that is large with respect to said given impedance.

References Cited

UNITED STATES PATENTS

| | | | |
|---|---|---|---|
| 2,811,590 | 10/1957 | Doremus et al. | 330—31 |
| 3,204,194 | 8/1965 | Steel et al. | 330—154 |

FOREIGN PATENTS

| | | |
|---|---|---|
| 618,685 | 4/1961 | Canada. |
| 948,737 | 3/1960 | Great Britain. |
| 1,322,036 | 2/1963 | France. |

ROY LAKE, Primary Examiner

L. J. DAHL, Assistant Examiner